United States Patent
Collin et al.

(10) Patent No.: US 6,427,178 B2
(45) Date of Patent: *Jul. 30, 2002

(54) SOFTWARE MODEM HAVING A MULTI-TASK PLUG-IN ARCHITECTURE

(75) Inventors: Zeev Collin, Herzliya; Tal Tamir, Givatayim, both of (IL)

(73) Assignee: Conexant Systems, Inc., Newport Beach, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/193,066

(22) Filed: Nov. 16, 1998

Related U.S. Application Data (63) Continuation-in-part of application No. 09/154,643, filed on Sep. 17, 1998, now abandoned.
(60) Provisional application No. 60/076,784, filed on Mar. 4, 1998.

(51) Int. Cl.⁷ .............................. G06F 9/44; G06F 9/445
(52) U.S. Cl. ................... 710/33; 709/3; 709/8; 709/303; 709/301
(58) Field of Search ...................... 710/1, 33; 709/1, 709/3, 8, 303, 301

(56) References Cited

U.S. PATENT DOCUMENTS

| | | |
|---|---|---|
| 4,385,384 A | 5/1983 | Rosbury et al. |
| 4,516,216 A | 5/1985 | Armstrong |
| 5,341,477 A | 8/1994 | Pitkin et al. ............ 395/200.56 |
| 5,357,519 A | 10/1994 | Martin et al. ............... 371/15.1 |
| 5,535,242 A | 7/1996 | Brigida et al. |
| 5,590,648 A * | 1/1997 | Mitchell et al. ............. 128/630 |
| 5,613,100 A | 3/1997 | Anezaki |

(List continued on next page.)

FOREIGN PATENT DOCUMENTS

| | | | | |
|---|---|---|---|---|
| EP | 0472386 | * | 2/1992 | ........... G06F/9/445 |
| JP | 06089239 A | | 3/1994 | |

OTHER PUBLICATIONS

Hastie et al. 'The Implementation of Hardware Subroutines on Field Programmable Gate Arrays', IEEE, May 1990, pp. 31.4.1–31.4.4.*

Dillien, 'Adaptive Hardware Becomes a Reality using Electrically Reconfigurable Arrays (ERAs)', Dec. 1990, pp. 2/1–2/10.*

IBM TDB, 'Asynchronous Task Scheduling', vol. 28, Issue No. 9, pp. 4001–4003, Feb. 1986.*

Brayman, et al., "A Direct Sequence Baseband Communications System Using Programmable Logic Devices", 1998, pp 144–151, IEEE 98CH36185, ISBN: 0–7803–4449–9.

Epenoy, G. and D. Pilost, "Dynamic Setting of Modem Parameters," IBM Technical Disclosure Bulletin, vol. 26, No. 1, Jun. 1983.

IBM TDB, "Asynchronous Task Scheduling," vol. 28, No. 9, pp. 4001–4003, Feb. 1986.

*Primary Examiner*—Jeffery Gaffin
*Assistant Examiner*—Rehana Perveen
(74) *Attorney, Agent, or Firm*—Farjami Farjami LLP (57) ABSTRACT

A multi-task structure for a software modem including a plurality of self-contained executable entities. The executable entities include at least a controller and a data pump with the controller operating as an interface between an operating system driver and the data pump when signals are passed from the operating system driver to the data pump. In addition, the data pump includes at least a scheduler and a hardware driver, the scheduler interacting with additional self-contained executable entities and enabling the data pump to operate using one or more individual ones of the additional self-contained executable entities according to the signals passed from the controller to the data pump.

21 Claims, 6 Drawing Sheets

U.S. PATENT DOCUMENTS

| | | | | |
|---|---|---|---|---|
| 5,630,132 A | * | 5/1997 | Allran et al. | 395/670 |
| 5,634,058 A | * | 5/1997 | Allen et al. | 395/712 |
| 5,649,001 A | | 7/1997 | Thomas et al. | |
| 5,732,261 A | * | 3/1998 | Savitzky et al. | 395/614 |
| 5,752,032 A | * | 5/1998 | Keller et al. | 395/681 |
| 5,774,793 A | * | 6/1998 | Cooper et al. | 455/89 |
| 5,778,226 A | * | 7/1998 | Adams et al. | 395/681 |
| 5,826,103 A | | 10/1998 | Whittaker | 710/8 |
| 5,878,120 A | | 3/1999 | O'Mahoney | 379/93.09 |
| 5,925,114 A | * | 7/1999 | Hoang | 710/48 |
| 5,960,198 A | * | 9/1999 | Roediger et al. | 395/704 |
| 6,023,507 A | | 2/2000 | Wookey | 380/21 |
| 6,073,179 A | | 6/2000 | Liu et al. | |
| 6,134,605 A | * | 10/2000 | Hudson et al. | 710/13 |

* cited by examiner

SOFTWARE MODEM HAVING A MULTI-TASK PLUG-IN ARCHITECTURE

CROSS-REFERENCE TO RELATED APPLICATIONS

The present application claims priority pursuant to 35 U.S.C. §119(e) to U.S. Provisional Application Serial No. 60/076,784, filed Mar. 4, 1998, now expired, which is hereby incorporated herein by reference in its entirety. Further, the present application is a continuation-in-part to 35 U.S.C. §120 to U.S. Non-provisional Patent Application Serial No. 09/154,643, filed Sept. 17, 1998, now abandoned, which is hereby incorporated herein by reference in its entirety. The present application is also related to co-pending U.S. application Ser. Nos. 09/192,627 and 09/193,304, filed on Nov. 16, 1998 and Nov. 17, 1998, respectively.

SPECIFICATION

BACKGROUND

1. Field of the Invention

The present invention relates to software modems, and more particularly to a software modem having a data pump with a plurality of self contained executable modules for updating and adding drivers to the software modem.

2. Description of the Related Art

Conventional modems accept digital data supplied by a computer system and convert it into modulated analog waves that are transmitted over a communication channel such as an analog telephone line. Modems also accept modulated analog waves via the communication channel and convert them into a digital form to pass on to the computer system.

Conventional modems using a telephone line communication channel send data at speeds commonly measured in bits per second, or bps. The most common modem speeds are 28,800 bps, 33,600 bps, and 56,000 bps. However, the actual speed of data moving across a telephone line varies and does not always equal the speed that the modem is capable of providing because the telephone line may operate with interference. Thus, to assure data integrity, data often travels across a telephone line communication channel at a lower speed than is available from the modem.

Modems have been classified according to various parameters such as potential modem speed, data compression techniques, and other communication protocols. Common classifications include V.34, for 33.6 kbps modems and V.90, for the 56 kbps modem standard.

A typical hardware modem operating on a general purpose computer includes a controller, a digital signal processor (DSP), a codec (coder/decoder), and a data access arrangement (DAA). External hardware modems typically include a universal asynchronous receiver-transmitter (UART) while internal hardware modems replace the UART with a hardware driver.

As processing power in general purpose computers has increased through development of higher powered microprocessors, modem designers have realized that the computer's processor can be used to handle some modem operations. Thus, some functionality performed by conventional hardware modems has begun to be implemented in software. As time goes one, more and more functionality of hardware modems is being realized in software. However, each time that new functionality is converted to software, the new software functionality is added to a single software object. Thus, if one part of the functionality is found to be operating improperly, the whole software object must be replaced.

The DSP of a software modem, by nature, performs many different signal processing tasks, e.g., data modulations, fax modulations, etc. In addition, the data pump performs general telephony tasks such as pulse or tone dialing. These tasks are implemented in a single software object and, in operation, consume a large amount of a computer's memory. Further, if the software modem is to be updated or changed, the whole object must be replaced. A hardware change in one area of the modem also requires total object replacement even though only a small portion of the object is affected.

SUMMARY OF THE INVENTION

Various aspects of the present invention can be found in a communication system comprising application software, communication software that interacts with the application software, and communication hardware that interacts with the communication software. The communication software includes at least one controller and a plurality of objects with the communication software operating as an interface between the application software and the communication hardware. Thus, the application software communicates with the communication hardware. The controller enables the application software to activate one or more individual ones of the plurality of objects to provide communication between the communication system and a communication channel.

The objects of the communication system often comprise driver modules having individual modem functionality. The at least one controller of the communication system enables the communication software to operate using a single one of the plurality of objects during operation of the communication system. The plurality of objects are individually modifiable and individually replaceable without regard to other ones of the plurality of objects and the plurality of objects are often selected from the group consisting of drivers, data link libraries, and threads.

Various other aspects of the present invention are realized in a method for operating a software modem on a computer system having a memory. The method comprises creating a plurality of software modules that interact with one another to perform software modem tasks on the computer system, scheduling the plurality of software modem tasks according to specific operations of the software modem, loading individual software modules into the memory of the computer system on an as needed basis as the software modem operates on the computer system, and unloading individual software modules from the memory of the computer system when the individual software module is no longer required for operation of the software modem on the computer system.

The method may also comprise modifying individual software modules from the plurality of software modules with the modifications occurring independently of software modules in the plurality of software modules that remain unmodified. Modifying individual software modules may comprise debugging, upgrading, or isolating the individual software modules, in some cases, to perform diagnostics on the software modem independent of the remaining software modules of the software modem.

Further, a software modem according to principles of the present invention may include communication software and a modem card. The communication software often includes a controller and a plurality of modules, the plurality of modules being independent from one another and operating according to instructions received from the controller such that only modules specified by the instructions are executed in the software modem. The modem card often includes another controller, additional modules, and communication hardware. The another controller controls which of the additional modules to activate for interaction with the communication hardware.

The plurality of modules of the software modem are often modifiable independently of one another and the controller. In fact, modules may be added to the plurality of modules already existing in the communication software of the software modem. In addition, the additional modules of the modem card are modifiable independently from one another and the controller of the modem card. Similar to the modules of the communication software, the modules of the modem card may be added to the additional modules already existing in the modem card of the software modem.

Other aspects of the present invention can be found in a software modem including a plurality of self-contained executable entities. The executable entities include at least a controller and a data pump with the controller operating as an interface between an operating system driver and the data pump when signals are passed from the operating system driver to the data pump. The data pump includes at least a scheduler and a hardware driver, the scheduler interacting with additional self-contained executable entities and enabling the data pump to operate using one or more individual ones of the additional self-contained executable entities according to the signals passed from the controller to the data pump.

The self-contained executable entities of the software modem according to the present invention often comprise driver modules having individual modem functionality. The scheduler enables the data pump to operate using a single one of the additional self-contained executable entities during operation of the software modem. The additional self-contained executable entities are individually modifiable and individually replaceable without regard to other ones of the additional self-contained executable entities. The additional self-contained executable entities are commonly selected from the group consisting of drivers, data link logic, and threads.

Still other aspects of the present invention can be found in a software modem that includes a controller and a data pump. The data pump may include an abstraction layer, a scheduler, a sampler, a hardware driver, and a plurality of modules. The plurality of modules are independent from one another and operate according to instructions received from the scheduler such that only modules specified by the instructions are executed in the software modem. Advantageously, the modules of the software modem are modifiable independently of one another and the controller. The modifiable modules comprise modules which enable adding additional modules to the plurality of modules already existing in the data pump of the software modem.

Other aspects of the present invention will become apparent with further reference to the drawings and specification.

BRIEF DESCRIPTION OF THE DRAWINGS

A better understanding of the present invention can be obtained when the following detailed description of the preferred embodiment is considered in conjunction with the following drawings.

DETAILED DESCRIPTION OF DRAWINGS

Figure 1:
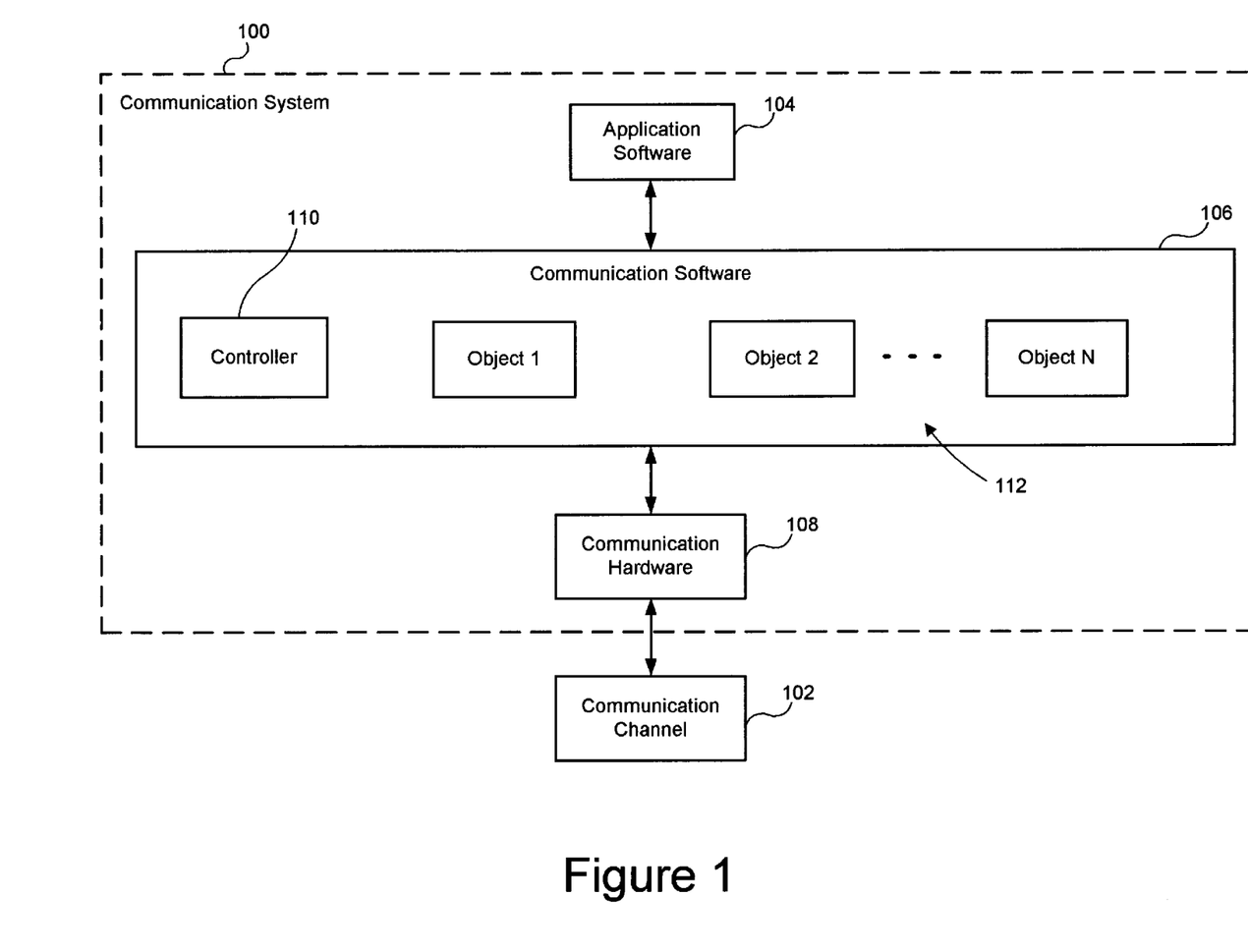
FIG. 1 is a block diagram of an exemplary communication system built in accordance with the principles of the present invention wherein, as illustrated, the communication system communicates with a communication channel via application software, communication software, and communication hardware.

FIG. 1 is a block diagram of an exemplary communication system 100 built in accordance with the principles of the present invention wherein, as illustrated, the communication system 100 communicates with a communication channel 102 via application software 104, communication software 106, and communication hardware 108. In one embodiment, a user controls the application software 104 in order to operate the communication system 100. The application software 104 interacts with the communication software 106 and prompts a controller 110 to determine which object(s) 112 to activate in order to operate the communication hardware 108 and carry out communications through the communication channel 102.

The object(s) 112 are interchangeable, modifiable, updateable, upgradeable, and may increase in number or in size. In one embodiment, one object 112 can interact with the application software 104 and activate other objects 112 to provide interaction with the communication hardware 108. Another embodiment provides multiple objects 112 to interact with the application software 104 and, together, activate a single object 112 for interaction with the communication hardware 108. Yet another embodiment provides for multiple objects 112 to interact with the application software 104 and then, in turn, to interact with multiple object 112 for interaction with the communication hardware 108. Advantageously, individual object(s) 112 can be modified without interfering with other object(s) 112. The object(s) 112 also enable the communication system 100 to operate using only the required object(s) 112 for the requested function in the communication system 100. Further, only the required object(s) 112 are activated or accessed depending on requirements from the communication hardware 108. Thus, the communication system 100 enables multi-task plug-in objects and operates more efficiently than prior art communication systems.

Figure 2:
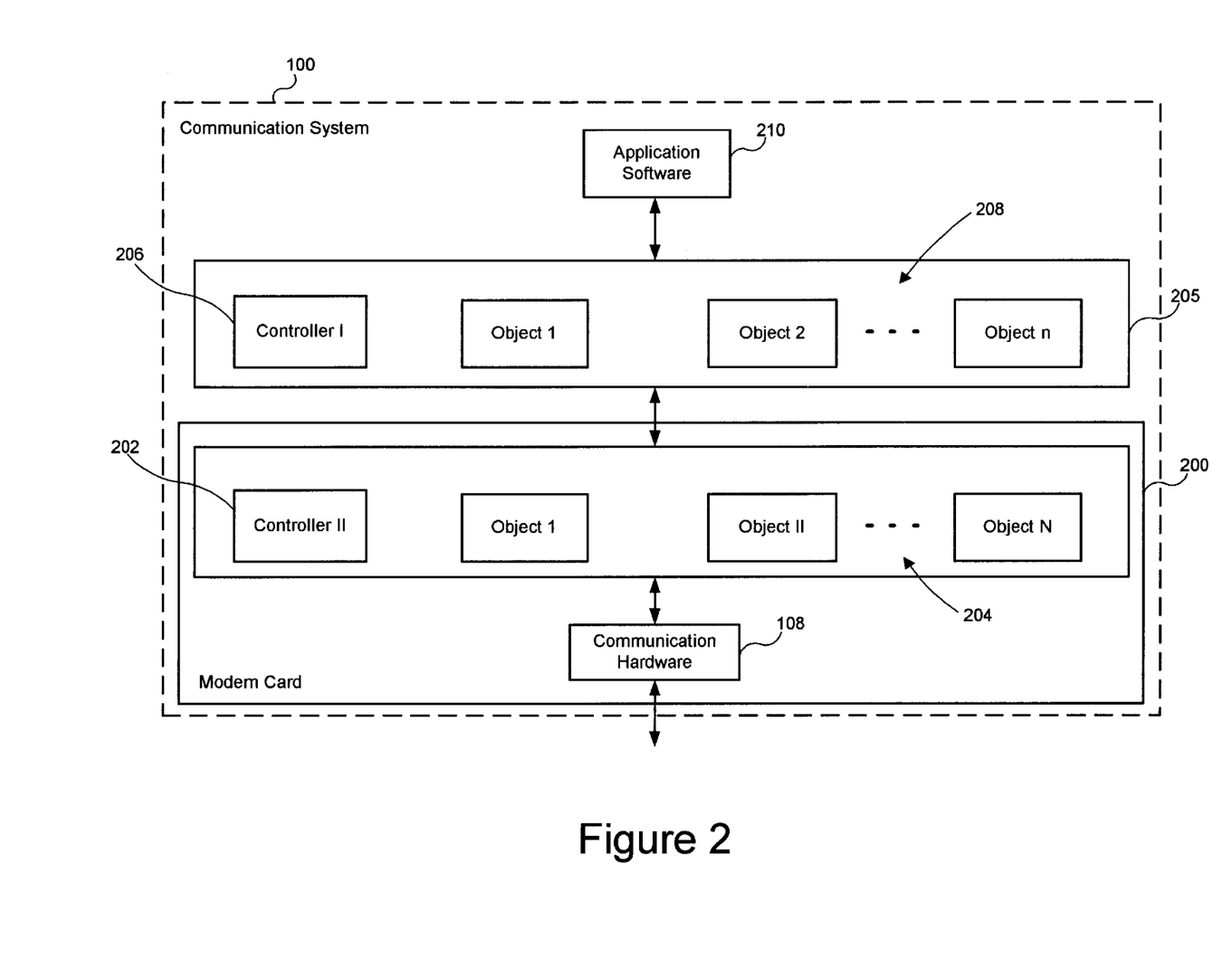
FIG. 2 is a block diagram of the communication system of FIG. 1 wherein the communication hardware of FIG. 1 is illustrated as being part of a modem card.

FIG. 2 is a block diagram of the communication system 100 of FIG. 1 wherein the communication hardware 108 is illustrated as being part of a modem card 200. The modem card 200 includes the communication hardware 108 and a controller 202 that controls object(s) 204 and activates specific ones of the object(s) 204 on the modem card 200 according to desired operations of the communications system 100. Like the communication system 100 of FIG. 1, object(s) 204 interact either directly or indirectly with the communication hardware 108 as instructed by the controller 202. Communication software 205 having a controller 206 is illustrated for controlling object(s) 208 as they interact with application software 210 and the modem card 200. The objects 204 and 208 interact as directed by the controllers 202 and 206, respectively, and create the interface between the communication software 205 and the modem card 200.

Figure 3:
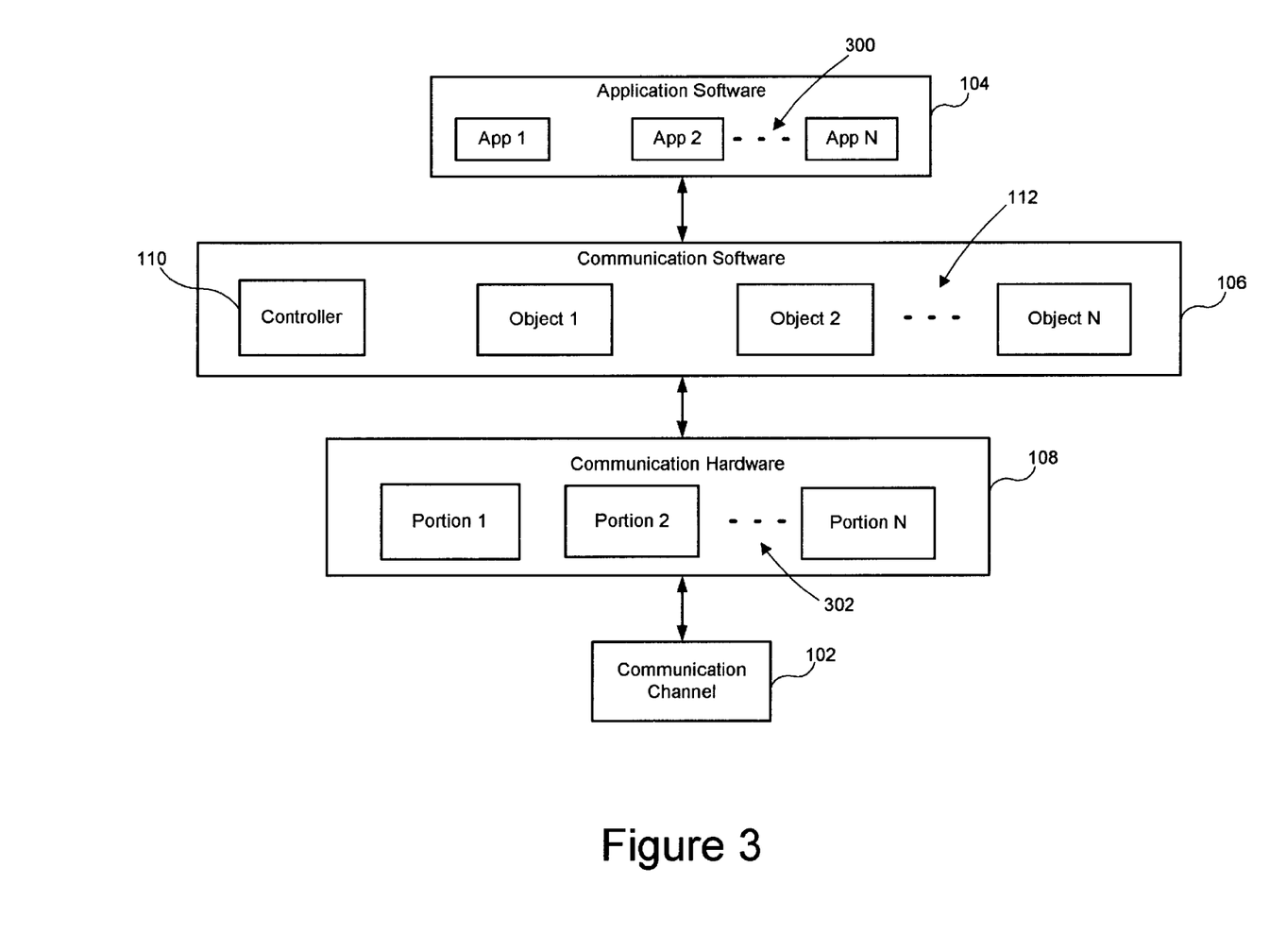
FIG. 3 is a block diagram of portions of the communication system of FIG. 1 wherein the application software and communication hardware are illustrated having multiple components.

FIG. 3 is a block diagram of portions of the communication system of FIG. 1 wherein the application software 104 and communication hardware 108 are illustrated as having multiple components. Specifically, in this embodiment, the application software 104 comprises a plurality of software applications 300 for user access to the communication software 106. Particular software applications 300 direct the communication software 106 in particular manners. For example, the controller 110 is directed to activate one of the objects 112 which in turn activates another of the objects 112 which in turn interacts with a portion 302 of the communication hardware 108. The portion 302 of the communication hardware 108 then interacts with another portion 302 which in turn interacts with the communication channel 102. Of course, other variations and combinations of the process of the application software 104 interacting with the communication channel 102 are possible and the above example is offered only for illustrative purposes.

Figure 4:
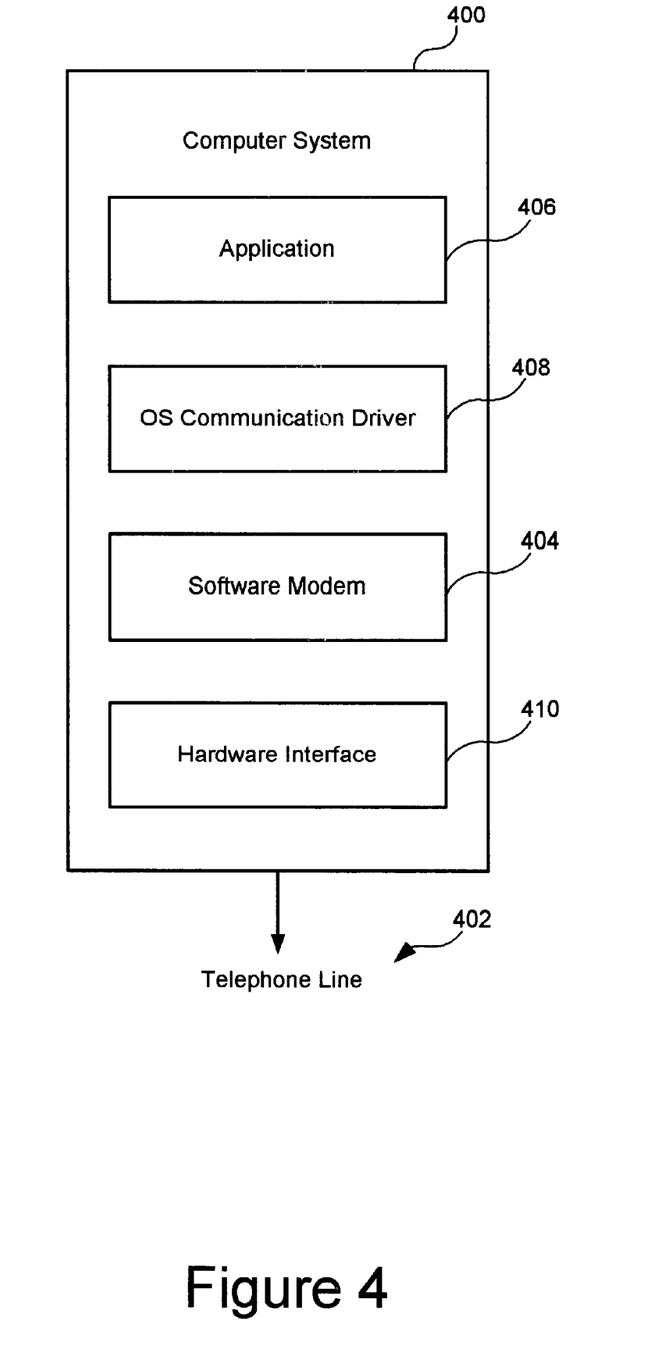
FIG. 4 is a block diagram of an exemplary computer system built in accordance with the principles of the present invention wherein the computer system is illustrated interacting with a telephone line via components such as a software modem.

FIG. 4 is a block diagram of an exemplary computer system 400 built in accordance with the principles of the present invention wherein the computer system 400 is illustrated interacting with a telephone line 402 via components such as a software modem 404. An application 406 accesses the software modem 404 through an operating system communication driver 408 and the software modem 404 accesses the telephone line 402 through a hardware interface 410. The application 406 is a standard modem application for a user to operate a modem on the computer system 400. The operating system communication driver 408 is a standard communication driver. The hardware interface 410 typically comprises a codec and a DAA and provides a path for the software modem 404 to communicate with the telephone line 402.

Figure 5:
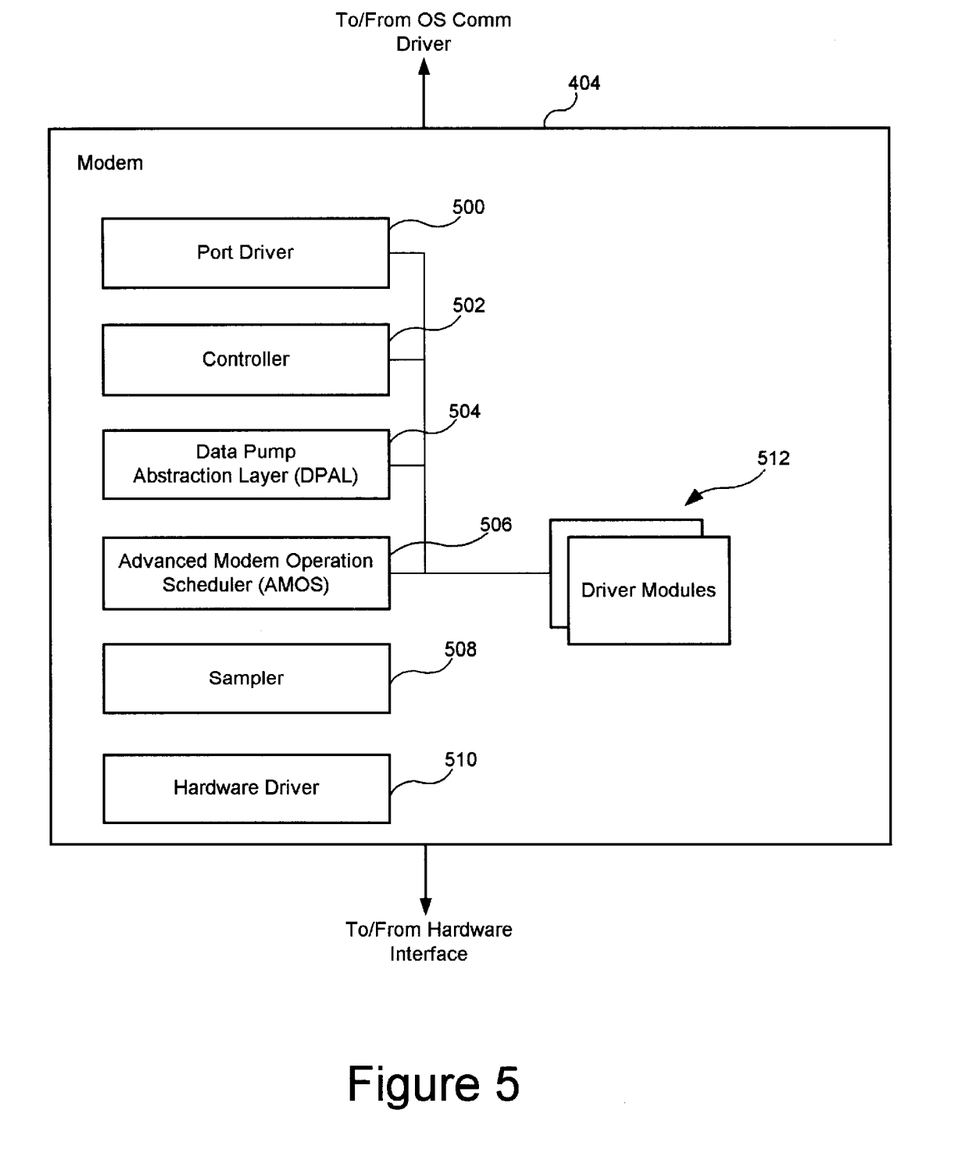
FIG. 5 is a block diagram of the software modem of FIG. 4 illustrated in greater detail than in FIG. 4.

FIG. 5 is a block diagram of the software modem 404 illustrated in greater detail than in FIG. 4. The software modem 404 is illustrated having a plurality of modules including a port driver 500, a controller 502, a data pump abstraction layer (DPAL) 504, an advanced modem operation scheduler (AMOS) 506, a sampler 508, and a hardware driver 510. Further, the software modem 404 includes a plurality of driver modules 512 that interact with the other modules in the software modem 404. Collectively, the modules between the controller 502 and the hardware interface 510 are often referred to as the "data pump" of the software modem 404.

Of particular note, the plurality of modules of the software modem 404 have been divided into individual tasks rather than being combined into a single object as in the related art. Specifically, in one embodiment, the data pump implements the scheduler (AMOS) 506 to select only the appropriate driver modules 512 for the requested modem task. For example, modems commonly provide both data and fax capabilities, and data modulations are not needed for fax sessions. Thus, the scheduler 506 of the data pump loads only the driver modules 512 for data modulation during data modulation operations. Likewise, if the modem 404 is to operate as a speaker phone, the scheduler 506 will load only the speaker phone module into memory. Similarly, each modem task that can be performed with an individual driver module is typically implemented as one of the driver modules 512 and the scheduler 506 loads the required driver module(s) into memory of the computer exclusive of the other driver modules that are not required.

Figure 6:
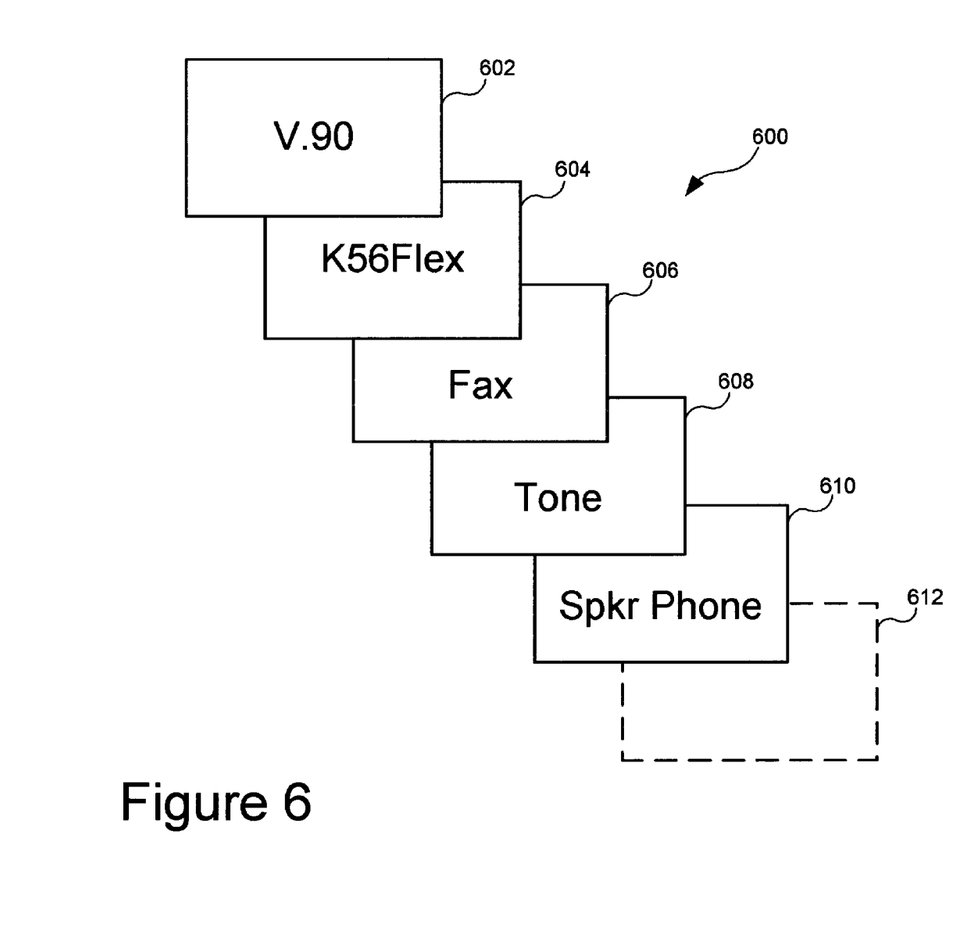
FIG. 6 is a block diagram of exemplary self-contained signal processing tasks or driver modules that operate in conjunction with the software modem of FIG. 4.

FIG. 6 is a block diagram of exemplary self-contained signal processing tasks or driver modules that operate in conjunction with the software modem 404. As illustrated, the driver modules 600 could include at least the following drivers, a V.90 driver 602, a K56Flex modem driver 604, a fax driver 606, a tone generator driver 608, a speaker phone driver 610, or other type of driver 612. The V.90 driver 602 represents the 56.0 kbps modem standard adopted by the modem Standards Committee. Similarly, the K56Flex modem driver 604 is a modem driver used by some modem manufacturers. Of course, the fax driver 606 represents a driver to be used for facsimile transmission, the tone generator driver 608 represents the driver for producing modem tones during modem 404 operation, the speaker phone driver 610 provides speaker phone capability for the modem 404, and as represented by the dotted lines of the other type of driver 612, numerous additional types of driver modules can be included to operate the modem 404 with the scheduler 506.

The multiple driver software modem 404 provides a software data pump in which each driver is a separate self contained object such as a driver, a data link library (DLL), a thread, etc. The scheduler 506 decides which driver should be loaded into computer memory, which driver should be activated, and what samples (if any) should be streamed to/from each of the drivers to the hardware interface 410. Dividing these tasks into separate drivers provides for efficient usage of computer memory because drivers can be loaded into memory only as needed for each particular session and unloaded in accordance with the session progress.

Since different drivers are loosely coupled, whenever a driver is modified, the other drivers that do not involve the modified driver do not need to be tested as would be required in a single object data pump. In particular, fixing a bug in a driver only requires replacement of a single driver and the rest of the software modem remains unchanged. These advantages also apply in the development stage, e.g., a new driver may be replaced without modifying the rest of the modem and each driver can be more easily isolated and developed separately.

In operation, a typical modem task is a modulation, such as V.90, V.34, a tone detector, or any other task such as a pulse dialer. Individual modules are available for each of these tasks. Another module could be implemented in which all the hardware accesses are contained in a single module thereby providing an abstract interface to other modules.

The above-listed sections and included information are not exhaustive and are only exemplary for computer systems. The particular sections and included information in a particular embodiment may depend upon the particular implementation and the included devices and resources. Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A modem driver for operation in a computer system having a memory, said modem driver comprising:
   a first driver module including a scheduler; and
   a plurality of second driver modules;
   wherein said first driver module is loaded into said memory, and wherein said scheduler loads one or more of said second driver modules into said memory or unloads one or more of said second driver modules from said memory.

2. The modem driver of claim 1, wherein said first driver module further includes a datapump abstraction layer, a sampler and a hardware driver.

3. The modem driver of claim 2, wherein said first driver module further includes a controller.

4. The modem driver of claim 1, wherein one of said second driver modules is a fax driver.

5. The modem driver of claim 1, wherein one of said second driver modules is a V.90 driver.

6. The modem driver of claim 1, wherein one of said second driver modules is a tone generator driver.

7. The modem driver of claim 1, wherein one of said second driver modules is a speaker phone driver.

8. A method of employing a software modem driver having a first driver module and a plurality of second driver modules in a computer system having a memory, said method comprising the steps of:
   loading said first driver module, including a scheduler, into said memory; and
   scheduling one or more of said plurality of second driver modules by said scheduler for execution by said computer system;
   wherein said scheduling step includes a step of loading one or more of said second driver modules into said memory and a step of unloading one or more of said second driver modules from said memory.

9. The method of claim 8, wherein said first driver module further includes a datapump abstraction layer, a sampler and a hardware driver.

10. The method of claim 9, wherein said first driver module further includes a controller.

11. The method of claim 8, wherein one of said second driver modules is a fax driver.

12. The method of claim 8, wherein one of said second driver modules is a V.90 driver.

13. The method of claim 8, wherein one of said second driver modules is a tone generator driver.

14. The method of claim 8, wherein one of said second driver modules is a speaker phone driver.

15. A modem system for operation in a computer system having a memory, said modem system comprising:
   a first driver module including a scheduler;
   a plurality of second driver modules;
   a codec for use by one or more of said driver modules; and
   a data access arrangement in communication with said codec;
   wherein said first driver module is loaded into said memory, and wherein said scheduler loads one or more of said second driver modules into said memory or unloads one or more of said second driver modules from said memory.

16. The modem system of claim 15, wherein said first driver module further includes a datapump abstraction layer, a sampler and a hardware driver.

17. The modem system of claim 16, wherein said first driver module further includes a controller.

18. The modem system of claim 15, wherein one of said second driver modules is a fax driver.

19. The modem system of claim 15, wherein one of said second driver modules is a V.90 driver.

20. The modem system of claim 15, wherein one of said second driver modules is a tone generator driver.

21. The modem system of claim 15, wherein one of said second driver modules is a speaker phone driver.

* * * * *